United States Patent
Phelan et al.

(10) Patent No.: US 6,702,701 B2
(45) Date of Patent: Mar. 9, 2004

(54) OIL PUMP WITH INTEGRAL FAST ACTING VALVE FOR CONTROLLING PLANETARY SYSTEM TORQUE

(75) Inventors: Perry Edward Phelan, Harsens Island, MI (US); Joseph Palazzolo, Livonia, MI (US); Todd Alan Kendall, Clinton Twp., MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/040,579

(22) Filed: Dec. 28, 2001

(65) Prior Publication Data

US 2003/0125149 A1 Jul. 3, 2003

(51) Int. Cl.$^7$ ............................................... F16H 47/08
(52) U.S. Cl. ............................ 475/91; 475/94; 475/107
(58) Field of Search ............................ 475/91, 92, 93, 475/94, 104, 107, 108

(56) References Cited

U.S. PATENT DOCUMENTS

| | | | |
|---|---|---|---|
| 1,120,591 A | * 12/1914 | Billet ........................ 475/107 |
| 1,127,313 A | 2/1915 | Sundh | |
| 1,689,537 A | 10/1928 | Sorensen | |
| 2,755,741 A | 7/1956 | Erskine | |
| 2,768,582 A | 10/1956 | Klessig et al. | |
| 2,808,004 A | 10/1957 | Durant et al. | |
| 2,842,011 A | 7/1958 | Skowron | |
| 2,960,890 A | * 11/1960 | Davis ........................ 475/107 |
| 2,987,943 A | * 6/1961 | Lemieux et al. ............. 475/107 |
| 3,397,597 A | * 8/1968 | Szekely ...................... 475/107 |
| 3,447,400 A | * 6/1969 | Serniuk ...................... 475/107 |
| 4,400,147 A | 8/1983 | Springer et al. ............ 418/206 |
| 4,544,333 A | 10/1985 | Hirano ....................... 417/299 |
| 4,971,528 A | 11/1990 | Hodgkins et al. ........... 417/310 |
| 5,211,257 A | * 5/1993 | Shuzo et al. ............. 192/58.92 |
| 5,456,642 A | * 10/1995 | Frost ........................... 475/93 |
| 5,564,992 A | * 10/1996 | Cunningham ................ 475/94 |
| 5,971,880 A | * 10/1999 | Keiser .......................... 475/83 |
| 6,135,909 A | 10/2000 | Keiser ........................ 475/107 |
| 6,318,532 B1 | * 11/2001 | Gassmann .................... 192/35 |

FOREIGN PATENT DOCUMENTS

| GB | 2213217 A | 8/1989 |
|---|---|---|
| GB | 2259338 A | 3/1993 |

* cited by examiner

*Primary Examiner*—Sherry Estremsky
(74) *Attorney, Agent, or Firm*—Brinks Hofer Gilson & Lione (57) ABSTRACT

This invention provides the use of a pump to regulate torque in a planetary gear system. The pump is provided with a bore and a valve, which operates to control the flow of fluid within the bore. When the valve is positioned within the bore to block the flow of fluid between the inlet and outlet of the pump, pressure is generated within the pump. The pump pressure is sufficient to generate torque in the planetary gear system.

14 Claims, 7 Drawing Sheets

OIL PUMP WITH INTEGRAL FAST ACTING VALVE FOR CONTROLLING PLANETARY SYSTEM TORQUE

FIELD OF THE INVENTION

This invention relates to a system for controlling torque through a planetary gear system. More specifically, the invention relates to the use of an oil pump with a fast acting integral valve to control torque, particularly wheel torque, in an automobile.

BACKGROUND OF THE INVENTION

In all-wheel drive or four-wheel drive automobiles, one set of wheels is directly connected to the power source through a transmission, an axle, and a series of shafts. The other set of wheels can be connected to the power source through a center differential, a coupling, or an active clutch. Typically, the function of the center differential is to regulate the proportion of power that is transmitted between the front and rear sets of wheels, thereby controlling vehicle traction and cornering characteristics.

Brakes, motors, and electric generators have been combined with planetary and differential systems to control wheel torque in automobiles. Many current systems regulate torque transfer between the front and rear sets of wheels by controlling the drag between plates in a fluid-filled clutch. The use of a clutch to transfer torque is expensive to implement, however, and the operation of the clutch generates a high amount of friction that dissipates a substantial amount of the torque being transferred. A more efficient and less expensive system to transfer torque is therefore desired.

SUMMARY

The below-described system of a pump combined with a planetary gear system transfers torque efficiently and controllably. The pump comprises an inner rotor, an outer rotor, an inlet port and an outlet port for a fluid, and a bore located between the inlet port and the outlet port. A valve, which is physically attached to a valve drive device, controls the flow of fluid within the bore. The valve drive device, along with a controller, positions the valve within the bore. When the valve is positioned to block the flow of fluid between the inlet and outlet ports of the pump, pressure is generated within the pump. The pressure of the pump generates torque in the planetary gear system.

Another embodiment of this invention is a method of regulating torque in a planetary gear system. First, the position of a valve for a pump is controlled. Pressure is then generated within the pump, and the torque generated is transferred to a planetary gear system by a sun gear attached to the pump.

Other systems, methods, features, and advantages of the invention will become apparent to one skilled in the art upon examination of the following figures and detailed description. All such additional systems, methods, features, and advantages are intended to be included within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention.

DETAILED DESCRIPTION OF THE PREFERRED EMBODIMENTS

Figure 1:
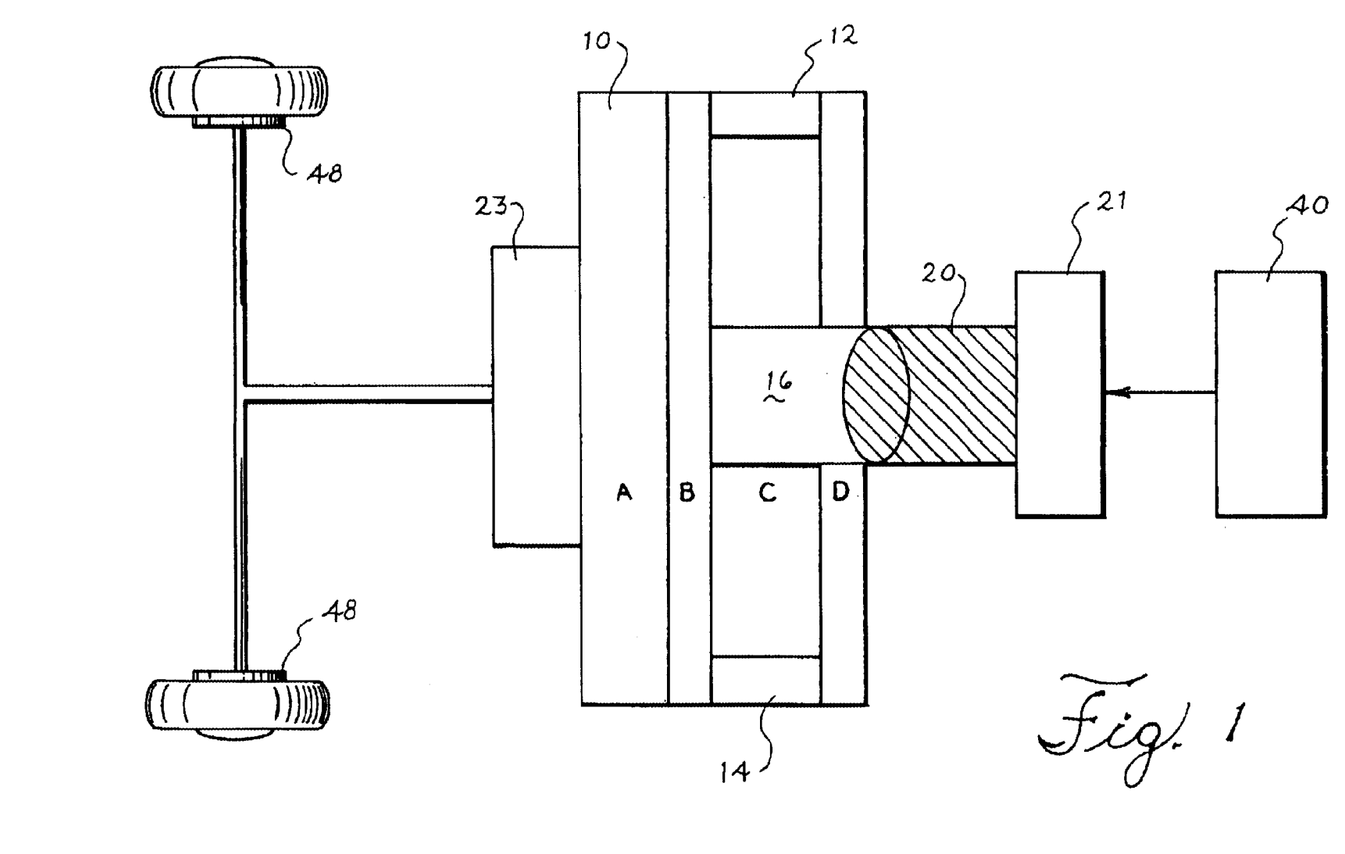
FIG. 1 is a schematic representation of a planetary gear system to control the transfer of torque through the gear system according to the present invention.

FIG. 1 shows a pump with an integral valve that is placed in a planetary gear system to control the transfer of torque through the system. A pump 10 is housed in section A of FIG. 1. In a preferred embodiment of the invention, the pump 10 is a gerotor oil pump. Other alternatives pump types may be used. For example, the pump 10 may be a gear pump, a crescent pump, or a vane pump.

The pump 10 further contains an inlet port 12 for fluid to enter the pump 10 and an outlet port 14 for fluid to exit the pump 10. A bore 16 is situated between the inlet and outlet port. The inlet port 12 and the outlet port 14 are located in section C of FIG. 1. The bore 16 extends through section C of FIG. 1.

A valve 20 is positioned within the bore 16 of pump 10. In a preferred embodiment of the invention, the valve 20 is a light, hollow cylinder. The cylinder is sized so that it can slide within the bore 16 of the pump 10. In another embodiment, the valve 20 is a spool valve. In an alternative embodiment, the valve 20 can be spring loaded, in either the forward or backward direction. In other embodiments, other valves inside or outside the bore 16 may be used.

Preferably, the valve 20 is physically coupled to a valve drive device 21. The valve drive device 21 controls the movement of the valve 20 within the bore 16 of the pump 10. In a preferred embodiment of the invention, the valve drive device 21 is a solenoid. Other valve drive devices may be used, including a pneumatic cylinder, a hydraulic cylinder, a stepper motor, or a servomotor.

During normal operation of the pump 10, the valve 20 will be positioned outside of section C and therefore outside of the bore 16 of the pump 10. The flow of fluid between the inlet and outlet ports is uninterrupted in this configuration. This high flow condition between the inlet and outlet ports results in low pressure within the pump as well as minimal torque production. The amount of torque generated by the pump 10 is a direct function of the pump pressure, and can be found through the following formula:

$$T = D*(P/2*\pi)$$

where T is torque, D is the volume of fluid displaced by the pump, and P is pressure.

Conditions may arise when a transfer of torque is required through the planetary gear system, for instance when four-wheel or all-wheel drive is desired in an automobile. A controller 40 controls the transfer of torque through the pump 10 to the planetary gear system. The controller 40 may be implemented as hardware, software, or a combination of both. In the preferred embodiment, the controller 40 is an automobile computer control system. In another embodiment, the controller 40 may be a microcomputer comprising a microprocessor, input/output devices, interface components, and a memory component. Other embodiments are possible, including a digital signal processor, an application specific integrated circuit, or an integrated circuit employing logic and memory.

The controller 40 is equipped for receiving input control signals as well as for transmitting control output signals. The controller 40 may receive input signals that indicate that a certain amount of torque is required in the planetary gear system. In a preferred embodiment, the controller receives input signals from sensors 48 located near all four wheels of an automobile. The sensors 48 measure the speed of each wheel while the automobile is in motion. The sensors 48 transmit output signals that correspond to the measured wheel speeds to the controller 40. Additionally, the controller 40 receives input signals from the sensors 48 that also measure responses to driver input. These sensors calculate various responses such as braking, wheel slip, yaw, oversteer, and understeer. Signals that correspond to these inputs are also transmitted to the controller 40.

Once these input signals reach the controller 40, the controller 40 performs a series of calculations. The controller 40 is programmed to output various control signals based on its calculations. For example, the controller 40 may determine that vehicle traction or yaw control is required. In order to provide the vehicle traction or yaw control, a predetermined amount of torque must be transferred through the planetary gear system to the wheels of the automobile.

In a preferred embodiment of the invention, the controller 40 calculates the amount of torque that must be transferred to the wheels through the planetary gear system based on the input signals. The controller 40 will then send an output signal to the valve drive device 21. After receiving the signal, the valve drive device 21 drives the valve 20 to a position determined by the controller 40 within the bore 16 of the pump 10. The valve 20 impedes the flow of fluid between the inlet port 12 and the outlet port 14, thus allowing the pump 10 to generate pressure. As the flow of fluid is restricted between the ports of the pump 10, the pressure generated by the pump 10 increases. The inner and outer rotors of the pump 10 will rotate more slowly as the fluid pressure builds up within the pump 10. In this configuration, the pump 10 is operating under low flow and high pressure conditions.

The pump 10 is coupled to a sun gear 23 of a planetary gear system. As the rotors of the pump 10 rotate and the pressure generated by the pump 10 increases, a gradual braking force is applied to the sun gear 23 by the increased pressure of fluid surrounding the gear system. This creates a speed differential between the sun gear 23 and the planetary gear system, which results in a transfer of torque through the planetary gear system. The amount of torque transferred through the planetary system is directly related to the degree to which the pump 10 applies a braking force to the sun gear 23, which is in turn directly related to the degree to which fluid flow is restricted between the ports of the pump 10 by the valve 20.

Figure 2:
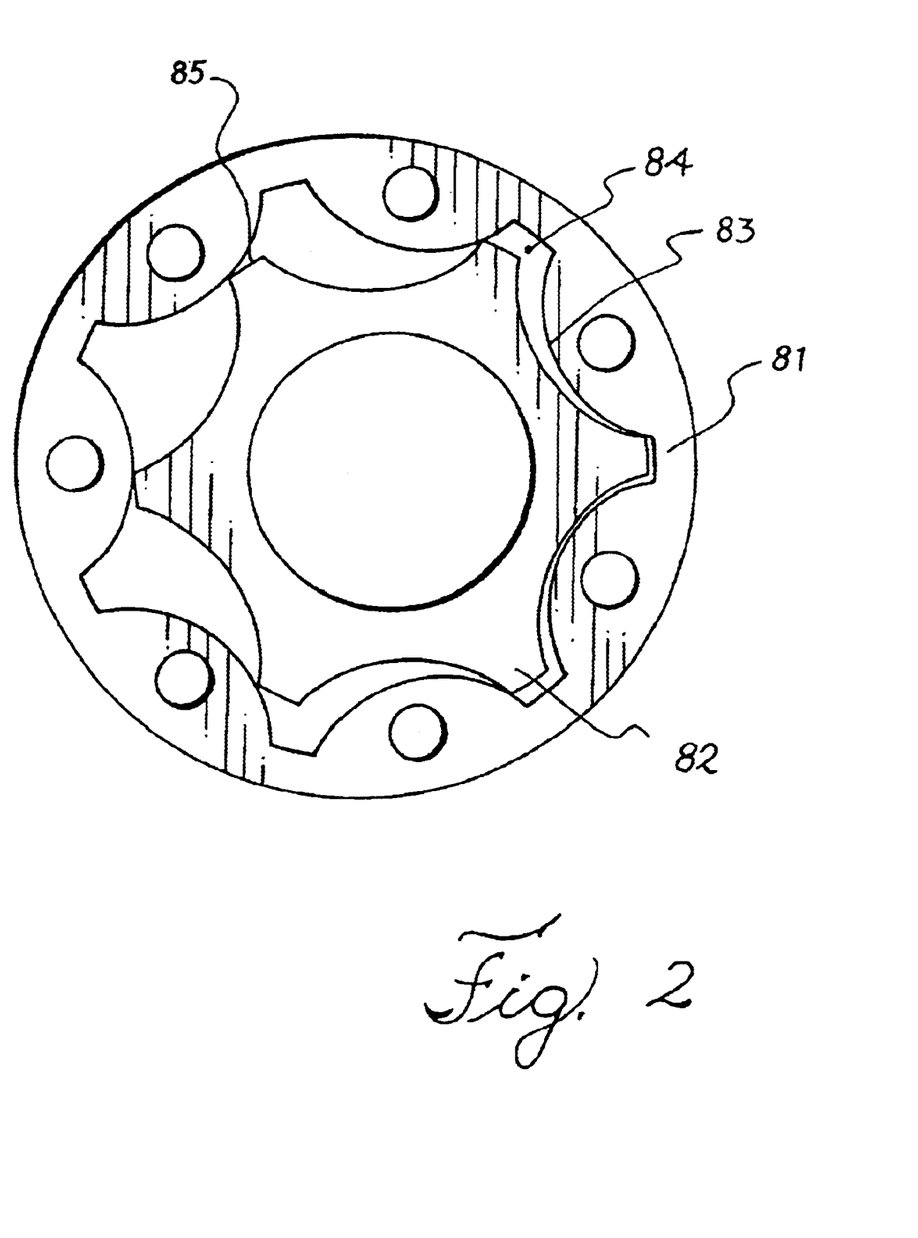
FIG. 2 is a perspective view of the rotors of a gerotor pump.

FIG. 2 is an illustration of the rotors of a gerotor pump. In a preferred embodiment of the invention, the pump includes an outer rotor 81 and an inner rotor 82. The outer rotor 81 is disposed about the inner rotor 82. In this embodiment, the outer rotor 81 is ring-shaped and provided with a plurality of evenly spaced, uniform concave ridges 83 about its inner periphery. The ridges define a plurality of valleys 84. The inner rotor 82 is ring-shaped and provided with a plurality of evenly spaced, uniform teeth 85 about its outer periphery for mating with the valleys 84 on the outer rotor 81. In a gerotor pump, there is typically one fewer tooth on the inner rotor than there are valleys in the outer rotor.

Figure 3:
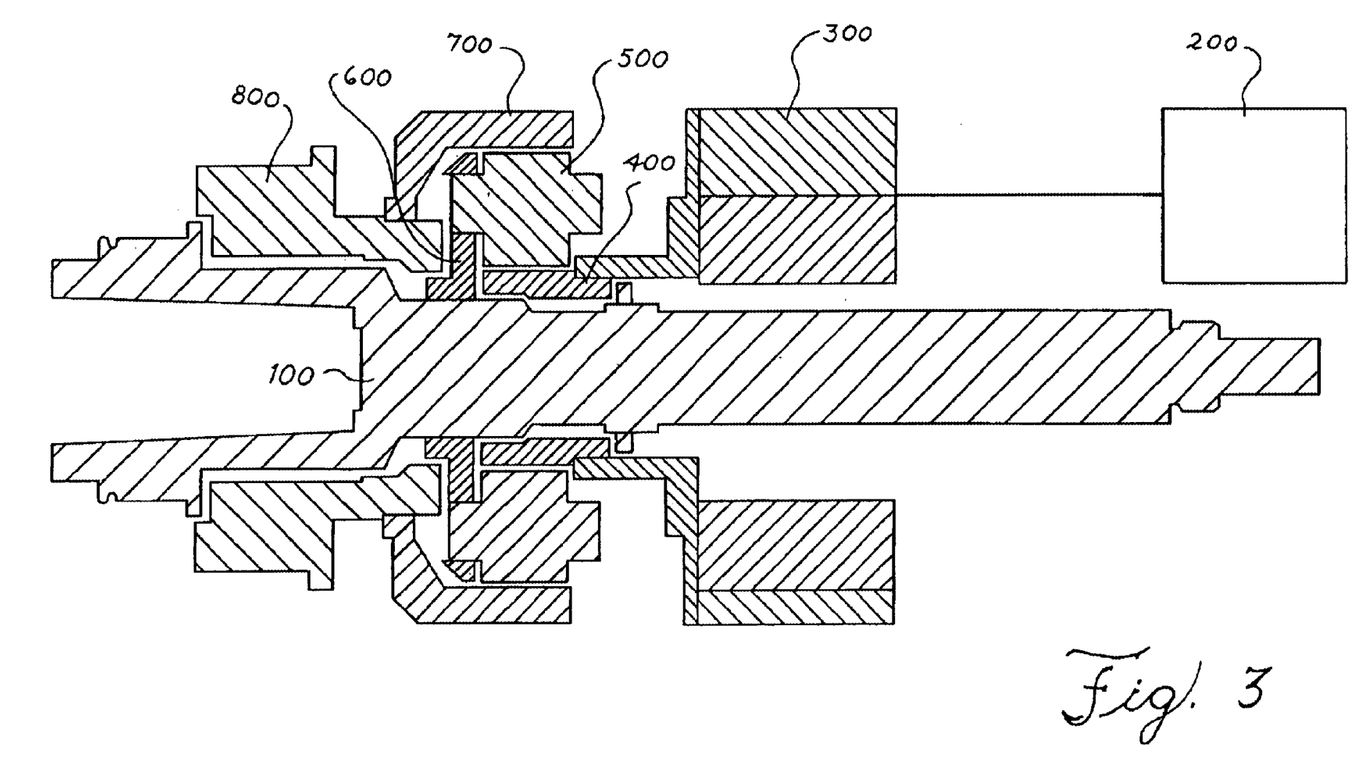
FIG. 3 is a perspective view of a system in an automobile to control wheel torque according to the present invention.

FIG. 3 is an illustration of a system in which the present invention may be implemented in an automobile to control wheel torque. In this embodiment, the system may include an input shaft 100, a control device 200, a pump 300, a sun gear 400, at least one planet gear 500, a carrier plate 600, a ring gear 700, and an output shaft 800. A first end of the input shaft 100 is adapted to be connected to a transmission. A second end of the input shaft 100 is adapted to be connected to a rear axle of an automobile.

The input shaft 100 is fixedly attached to the carrier plate 600. In an alternative embodiment, the input shaft 100 may be fixedly attached to the outer surface of the carrier plate 600. The planet gears 500 are rotatably attached to the carrier plate 600, and are further disposed between the ring gear 700 and the sun gear 400. The ring gear 700 is provided with a plurality of teeth disposed about its inner periphery for meshing with corresponding teeth disposed about the periphery of the planet gears 500. The sun gear 400 is rotatably disposed within the planet gears 500 and is further coupled to a pump 300. The sun gear 400 is provided with teeth about its periphery for meshing with the teeth disposed about the periphery of the planet gears 500.

The pump 300 preferably is electrically coupled to a control device 200. In a preferred embodiment of the invention, the control device 200 is used to control the operations of the pump 300. The ring gear 700 is coupled with the first end of an output shaft 800. The second end of the output shaft 800 is coupled to the front axle of an automobile.

Figure 4:
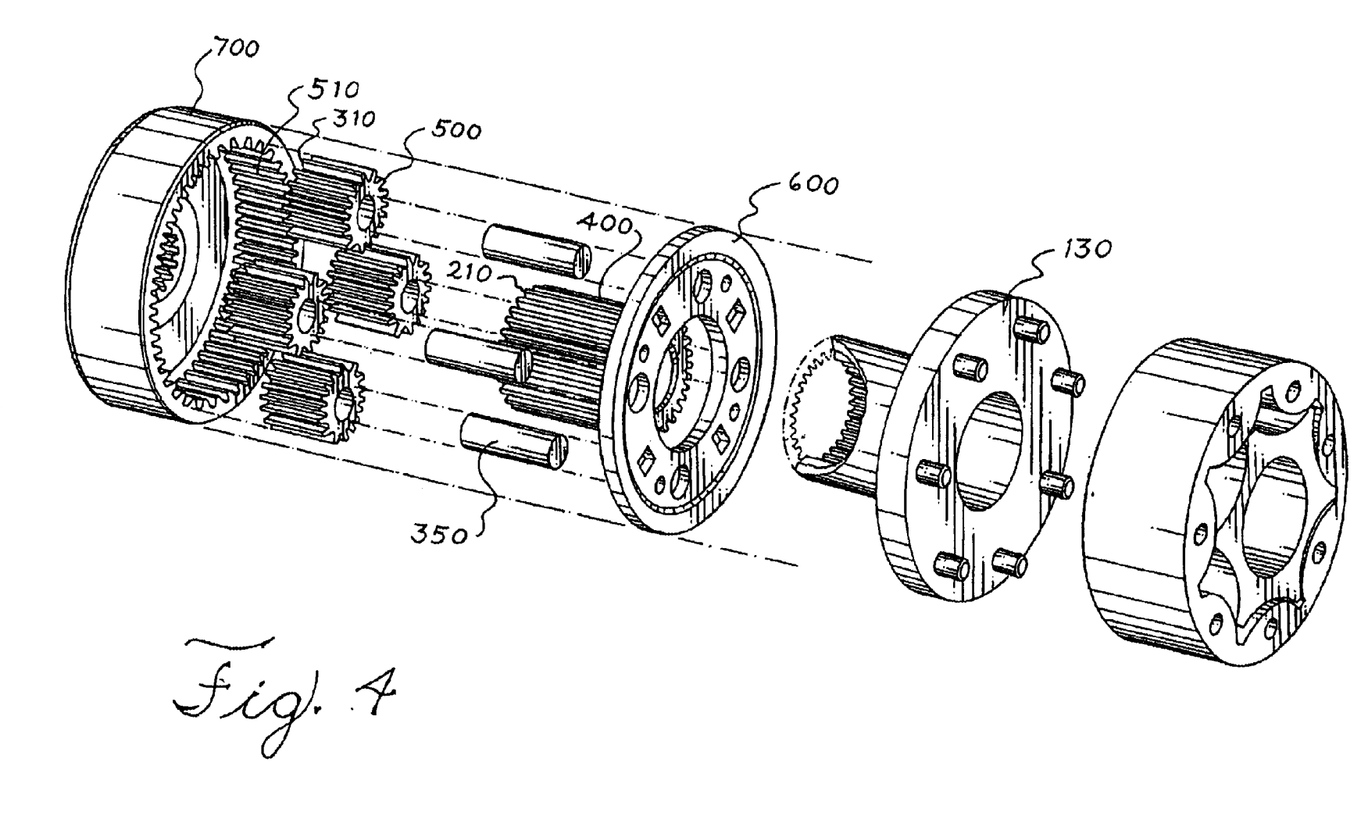
FIG. 4 is an exploded view of an embodiment of FIG. 3.

FIG. 4 is an exploded view of an embodiment of FIG. 3 that details the elements of the planetary gear system. A connecting member 130, splined on its inner periphery, meshes with a sun gear 400, which is provided with teeth 210. The planetary gears 500 are provided with teeth 310 that mesh with the sun gear 400. The planetary gears 500 are rotatably attached to the carrier plate 600 by connector pins 350. In one embodiment, there are four planetary gears 500 attached to the carrier plate 600. A ring gear 700, provided with a plurality of teeth 510 disposed about its inner periphery, meshes with the planetary gears 500.

Figure 5:
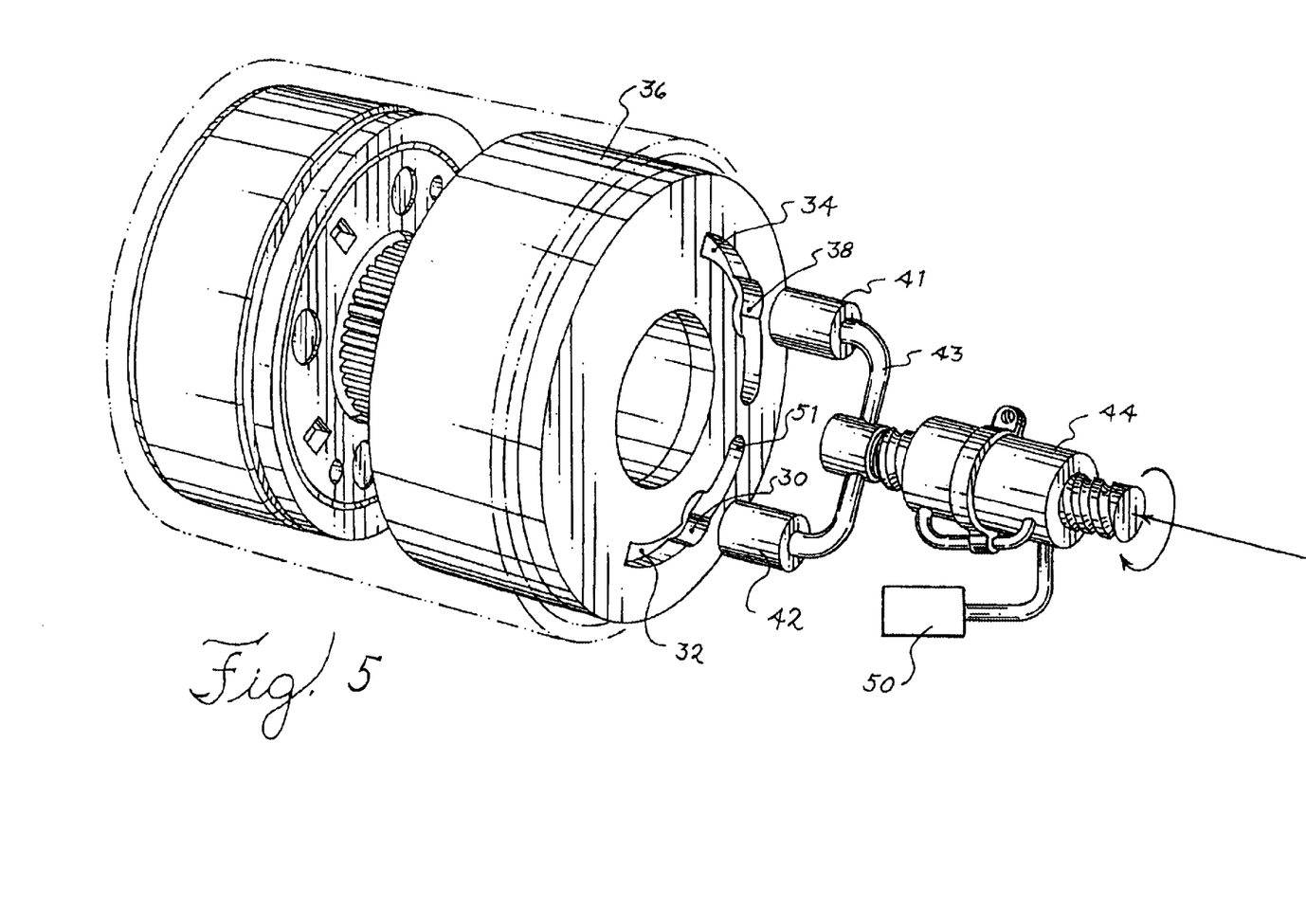
FIG. 5 is a perspective view of an embodiment of FIG. 1.

FIG. 5 is a more detailed illustration of the embodiment of FIG. 1 with a bore 30 defined within the outlet port 32 and a bore 38 defined within the inlet port 34 of a pump 36. The pump 36 contains an inlet port 34 for fluid to enter the pump 36 and an outlet port 32 for fluid to exit the pump 36. A piston 41 is positioned outside the bore 38 of the inlet port 34. In a preferred embodiment of the invention, the piston 41 is a light, hollow cylinder. Piston 41 is sized so that it can slide within the bore 38 of the inlet port 34. Piston 42 is positioned outside of the bore 30 of the outlet port 32. In a preferred embodiment of the invention, the piston 42 is a light, hollow cylinder. The piston 42 is sized so that it can slide within the bore 30 of the outlet port 32.

The two pistons are physically attached by a connecting member 43. The connecting member 43 is further coupled to an actuator 44. The actuator 44 controls the movement of the connecting member 43, which moves the pistons 41 and 42 in and out of the bores of the pump 36. In a preferred embodiment of the invention, the actuator 44 is a solenoid. Other actuators may be used, including alternatives such as a pneumatic cylinder, a hydraulic cylinder, a stepper motor, or a servomotor. A controller 50 is coupled to the actuator 44. The controller 50 outputs signals to the actuator 44, which acts to position the pistons 41 and 42 within the bores 38 and 30.

In normal operation, the piston 41 does not block the flow of fluid through the inlet port 34. Similarly, the piston 42 does not block the outlet flow of fluid through the outlet port 32. In this configuration, the freely-flowing fluid is not under pressure. To create pressure, the actuator 44 drives the pistons 41 and 42 within the bores 38 and 30 to a position where the pistons 41 and 42 substantially block the flow of fluid between the inlet port 34 and the outlet port 32 of the pump 36. The controller 50 controls the degree to which the pistons 41 and 42 restrict the flow of fluid within the pump 36. A greater restriction of flow results in a greater amount of pressure generated by the pump 36. As the actuator 44 drives the pistons 41 and 42 into and out of the bores 38 and 30, the pressure generated by the pump 36 increases or decreases accordingly.

In an alternative embodiment, a feedback system can also be used to control the amount of torque that is produced by the planetary system. The pump 36 is equipped with a sensor 51 to measure the amount of pressure generated by the pump 36. In a preferred embodiment, the sensor 51 is located on an outlet line of the pump 36. The pressure sensor 51 further produces pressure detection signals in accordance with the pump pressure. These pressure detection signals are continuously or periodically transmitted to the controller 50.

In a preferred embodiment, the actuator 44 is a ballscrew. In response to the signal from the controller 50, the actuator 44 may drive the piston 42 to another location within the bore 30 of the outlet port 32, or the piston 42 may be driven to a position outside the bore 30. The repositioning of the piston 42 increases or decreases the amount of pressure produced within the pump 36. This feedback system allows the controller 50 to more accurately control the amount of pressure created in the pump 36.

Figure 6:
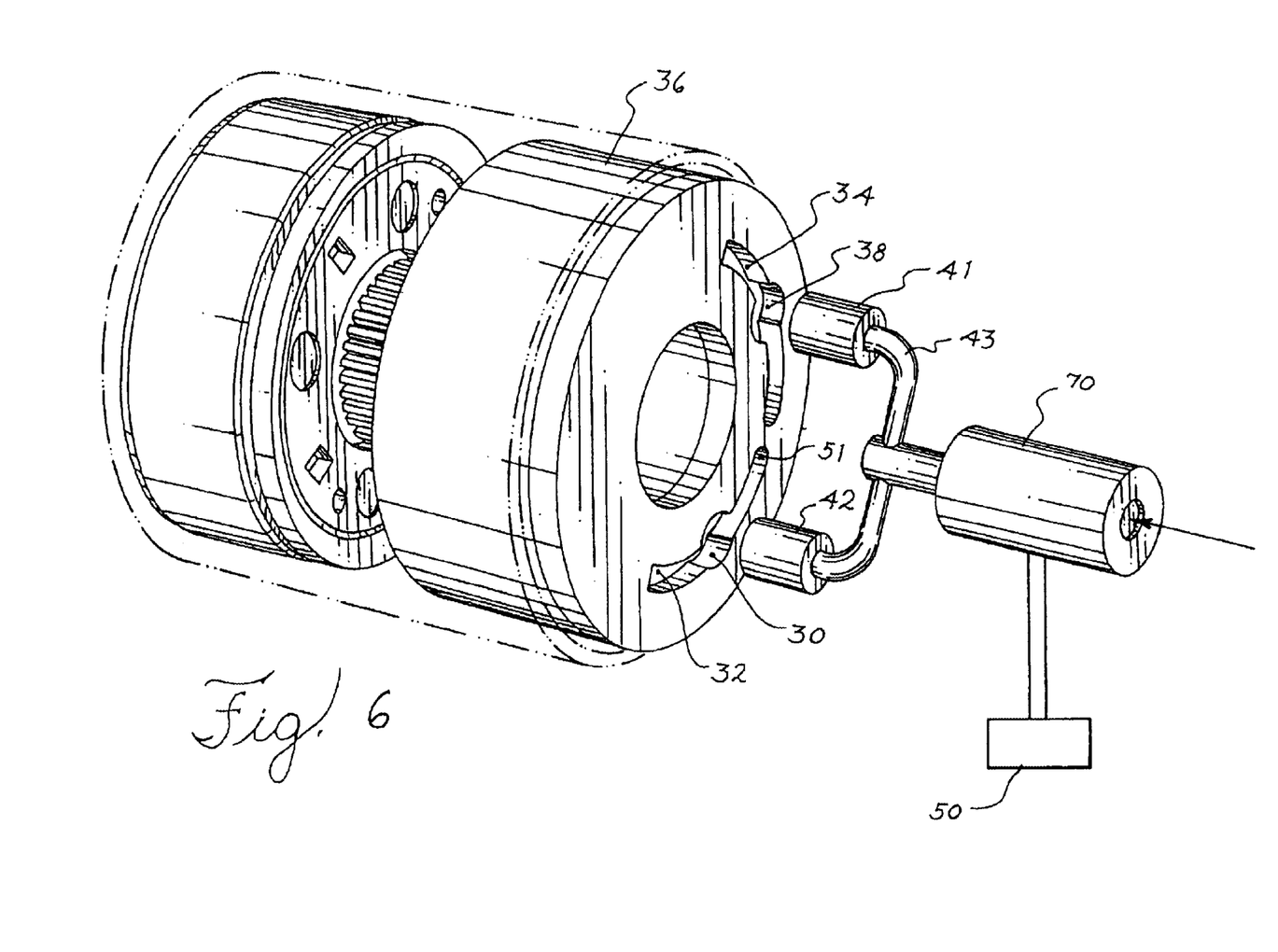
FIG. 6 is a perspective view of the embodiment of FIG. 5 with a solenoid.

FIG. 6 is an illustration of the embodiment of FIG. 5 with a solenoid 70 used to position the pistons 41 and 42 within the bores 38 and 30 of the pump 36. The solenoid 70 is attached to the pistons by a connecting member 43. A controller 50, coupled with the solenoid 70, outputs control signals to control the operation of the solenoid 70.

Under normal operating conditions, the pistons 41 and 42 are positioned outside of the bores 38 and 30. When pressure is required in the pump 36, the controller sends an "on" signal to the solenoid 70. When the solenoid 70 receives the "on" signal, it drives the pistons 41 and 42 within the bores 38 and 30. The pistons 41 and 42 restrict the flow of fluid between the inlet and the outlet of the pump 36, which allows the pump 36 to generate pressure.

To rapidly stop the generation of pressure by the pump 36, the controller sends an "off" signal to the solenoid 70. When the solenoid 70 receives the "off" signal, it retracts the pistons 41 and 42 from their positions within the bores 38 and 30. The pump 36 returns to a state of unrestricted fluid flow in and out of the pump ports, decreasing the pressure generated by the pump 36.

Figure 7:
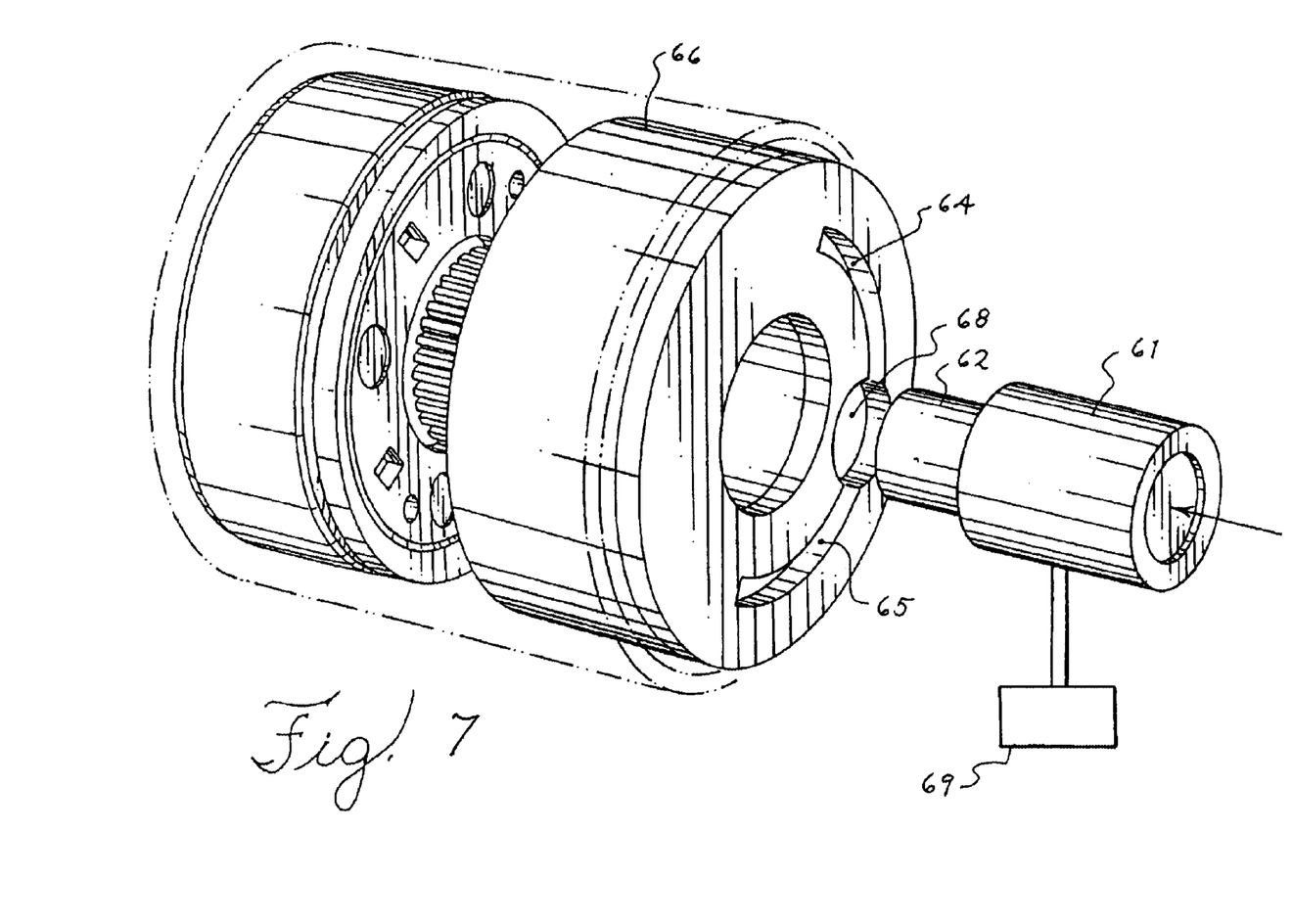
FIG. 7 is a perspective view of the embodiment of FIG. 1 with a solenoid.

FIG. 7 illustrates an embodiment of FIG. 1 having a single bore 68 defined between the inlet and outlet ports. A solenoid 61 positions the valve 62 within the bore 68. The pump 66 contains an inlet port 64 and an outlet port 65 for fluid to enter and exit the pump 66. A bore 68 is situated between the inlet port 64 and the outlet port 65. In normal operation, a valve 62 is positioned outside the bore 68, allowing the fluid within the pump 66 to recirculate between the inlet port 64 and the outlet port 65. The valve 62 is attached to a solenoid 63, which is coupled to a controller 69. The controller 69 outputs signals to the solenoid 63, which acts to position the valve 62 within the bore 68.

To create pressure, the solenoid 63 drives the valve 62 to a position within the bore 68 to restrict the fluid flow between the ports of the pump 66. The fluid no longer freely circulates between the ports, and pressure is created as fluid exits the outlet port 65 of the pump 66.

Various embodiments of the invention have been described and illustrated. However, the description and illustrations are by way of example only. Many more embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

We claim:

1. A system of regulating torque in a planetary gear system, said system comprising:
    a pump adjacent said planetary gear system, said pump comprising an inner rotor, an outer rotor, an inlet port for a fluid, an outlet port for said fluid, and at least one bore;
    a valve for selectively controlling fluid flow within said at least one bore of said pump;
    a valve drive device coupled to said valve;
    a controller to control said valve drive device; and
    an output shaft coupled to said outer rotor and said planetary gear system, wherein pressure generated by said pump slows said outer rotor and transmits torque through said planetary gear system.

2. The system of claim 1, wherein said at least one bore is defined between said inlet port and said outlet port.

3. The system of claim 1, wherein said valve further comprises a hollow cylinder operative to slide within said bore.

4. The system of claim 1, wherein said valve drive device is selected from the group consisting of a pneumatic cylinder, a hydraulic cylinder, a stepper motor, and a servomotor.

5. The system of claim 1, wherein said valve further comprises a spool valve.

6. The system of claim 1, wherein said output shaft is further coupled to a sun gear, said sun gear operative to receive torque from said output shaft and to transmit torque through said planetary system.

7. The system of claim 1, wherein said controller further comprises a microcomputer, said microcomputer comprising a microprocessor, an input device, an output device, interface components, and a memory component.

8. The system of claim 1, wherein said controller further comprises an automobile computer control system.

9. The system of claim 1, further comprising a feedback system coupled with said controller, said feedback system operative to transmit pressure signals from at least one pressure sensor to said controller.

10. A system for controlling vehicle wheel torque in an automobile, said system comprising:
    a planetary gear system comprising a sun gear, at least one planet gear, a planet carrier, and a ring gear;
    an input shaft coupled with said planetary gear system;
    a pump coupled to said planetary gear system, said pump comprising an inner rotor, an outer rotor, an inlet port, an outlet port, arid a bore;
    a valve for controlling fluid flow within said bore of said pump;

a valve drive device coupled to said valve, wherein said valve drive device is selected from the group consisting of a pneumatic cylinder, a hydraulic cylinder, a stepper motor, and a servomotor;

a controller linked to said valve drive device; and an output shaft coupled to said planetary gear system.

11. The system of claim 10, wherein said valve further comprises a hollow cylinder operative to slide within said bore.

12. The system of claim 10, wherein said bore is defined between said inlet port and said outlet port.

13. The system of claim 10, wherein said valve further comprises a spool valve.

14. The system of claim 10, wherein said controller further comprises a microcomputer, said microcomputer comprising a microprocessor, an input device, an output device, interface components, and a memory component.

* * * * *

UNITED STATES PATENT AND TRADEMARK OFFICE
CERTIFICATE OF CORRECTION

PATENT NO. : 6,702,701 B2 Page 1 of 1
DATED : March 9, 2004
INVENTOR(S) : Perry E. Phelan et al.

It is certified that error appears in the above-identified patent and that said Letters Patent is hereby corrected as shown below:

Column 6,
Line 65, after "port," delete "arid" and substitute -- and -- in its place.

Signed and Sealed this

Seventeenth Day of August, 2004

JON W. DUDAS
*Acting Director of the United States Patent and Trademark Office*